United States Patent [19]

Senuma

[11] 4,395,105
[45] Jul. 26, 1983

[54] DEVICE FOR ADJUSTING DRIVING SPRING OF FOCAL PLANE SHUTTER

[75] Inventor: Michio Senuma, Tokyo, Japan

[73] Assignee: Canon Kabushiki Kaisha, Tokyo, Japan

[21] Appl. No.: 336,497

[22] Filed: Dec. 31, 1981

[30] Foreign Application Priority Data

Jan. 13, 1981 [JP] Japan .................................. 56-3160

[51] Int. Cl.³ ............................................. G03B 9/40
[52] U.S. Cl. ................................................. 354/246
[58] Field of Search ............... 354/245, 246, 247, 248, 354/249

[56] References Cited

U.S. PATENT DOCUMENTS 1,231,878 7/1917 Grenell .............................. 354/245
4,110,772 8/1978 Nakagawa et al. ................. 354/246

*Primary Examiner*—Alan Mathews
*Attorney, Agent, or Firm*—Toren, McGeady and Stanger

[57] ABSTRACT

A device for adjusting a focal plane shutter driving spring includes a ratchet wheel which holds one end of the shutter driving spring and is arranged to adjust the driving force of the spring by the rotation thereof. The ratchet wheel is provided with a ratchet part having fine teeth arranged to engage a ratchet pawl and a gear part having relatively coarse teeth.

4 Claims, 6 Drawing Figures

DEVICE FOR ADJUSTING DRIVING SPRING OF FOCAL PLANE SHUTTER

BACKGROUND OF THE INVENTION

1. Field of the Invention

This invention relates to a device for adjusting a focal plane shutter driving spring arranged to permit automatic adjustment of the spring.

2. Description of the Prior Art

Heretofore, the driving springs of a focal plane shutter consisting of metal blades have been provided with adjustment devices, which are arranged as shown in FIGS. 1 and 2 of the accompanying drawings. The conventional arrangement shown includes a shutter base plate 1 and a cover plate 2. Between the base plate 1 and the cover plate 2, there are provided leading and trailing shutter curtains each of which consists of a plurality of divided blades linked with a driving lever and an auxiliary lever which is not shown. In FIG. 1, trailing shutter blades $4_1$-$4_5$ are shown as in a state of covering an aperture. A base plate 5 of a shutter control part is connected to the shutter base plate 1 by posts 6 and 7 and other posts which are not shown. The post 6 has a trailing curtain driving lever 3 and a ratchet wheel 8 rotatably fitted thereon. Between the lever 3 and the wheel 8, there is wound a trailing curtain driving spring 9. One end of the spring 9 is fitted in and retained by a groove provided in the ratchet wheel 8. The other end of the spring is hooked on a pin 3b disposed on the driving lever 3. There are also provided a ratchet pawl 10, a leading shutter curtain driving lever 11, a leading curtain driving spring 12, a ratchet wheel 13 and a ratchet pawl 14 all of which are provided for the leading shutter curtain and are arranged in a manner similar to the parts provided for the trailing curtain.

Referring now to FIG. 2, in the conventional arrangement described above, the ratchet wheel 8 is rotated counterclockwise for strengthening the driving force of the spring. To slacken the spring, the pawl 10 is disengaged from the ratchet teeth and the ratchet wheel 8 is rotated clockwise. Such adjustment work on the spring has been manually carried out in general. However, the adjustment work has been extremely troublesome because during the adjustment and particularly when the spring 9 is to be slackened, the ratchet pawl 10 is removed and then the ratchet wheel 8 must be turned while keeping it under the same condition.

Further, automation of the assembly of cameras and shutters has recently become more advanced. However, since the teeth of the ratchet wheel 8 are very minutely arranged for fine adjustment, it is quite difficult to have the ratchet wheel rotated with teeth engaged. Hence, despite the advanced automation of the assembly work, it has been inevitable that in this adjustment work, recourse has been had to manual operation.

SUMMARY OF THE INVENTION

It is an object of this invention to provide a driving spring adjusting device for a focal plane shutter which solves the above stated problem of the conventional device. In the device according to the invention, a ratchet wheel is formed into two steps, one step representing a ratchet part and the other a gear part which is arranged to engage the gear of an automatic adjusting device.

The above and further objects, features and advantages of the invention will become apparent from the following detailed description of embodiments thereof taken in connection with the accompanying drawings.

DESCRIPTION OF PREFERRED EMBODIMENT

Figure 1:
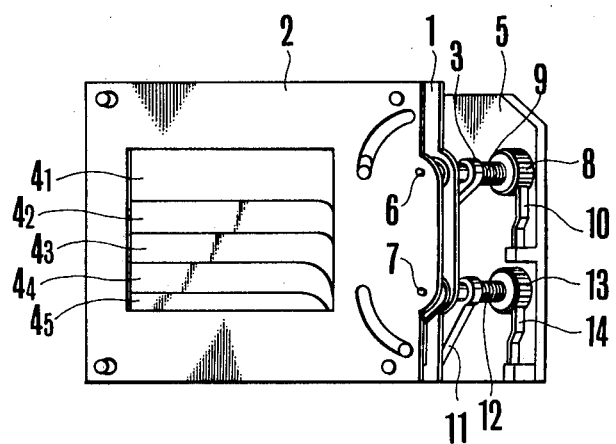
FIG. 1 is an illustration representing the arrangement of the conventional driving spring adjusting device for a shutter.
Figure 2:
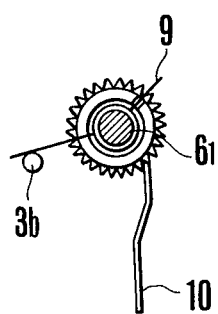
FIG. 2 is a detail view showing the essential parts of the conventional device shown in FIG. 1.
Figure 3:
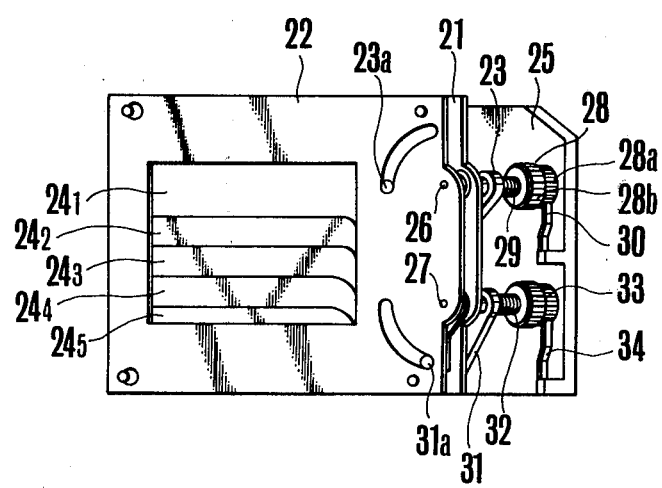
FIG. 3 is an illustration of a driving spring adjusting device for a shutter representing an embodiment of the present invention.
Figure 4:
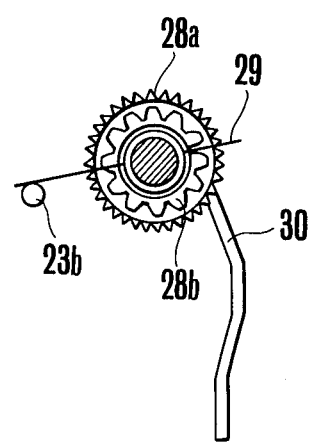
FIG. 4 is a detail view showing the essential parts of the embodiment shown in FIG. 3 in a state while being used in combination with an automatic speed governor.

FIG. 3 shows a driving spring adjusting device for focal plane shutter as a preferred embodiment of the present invention. Referring to FIG. 3, there are provided a shutter base plate 21 and a cover plate 22. Leading and trailing shutter curtains each of which is composed of a plurality of divided blades and is linked with a driving lever and an auxiliary lever are arranged between the shutter base plate 21 and the cover plate 22. In the drawing, the blades $24_1$-$24_5$ of the trailing shutter curtain are shown in a state covering an aperture. A base plate 25 of a shutter control part is connected to the shutter base plate 21 through posts 26 and 27 and other posts which are not shown. Round the post 26 are fitted a trailing curtain driving lever 23 and a ratchet wheel 28. They are arranged to be rotatable on the post 26. Between the lever 23 and the ratchet wheel 28, a trailing curtain driving spring 29 is wound round the post 26. The ratchet wheel 28 is divided into a ratchet part 28a and a gear part 28b. The ratchet part 28a is provided with fine teeth which are arranged to engage a ratchet pawl 30 for fine adjustment of the driving force of the driving spring 29 in the same manner as in the conventional arrangement. The teeth and the pawl are shaped so as to enable the ratchet to rotate in either direction as shown in FIG. 4. Meanwhile, the gear part 28b is shaped into a spur gear having a larger pitch than the ratchet teeth. The gear part 28b is arranged to firmly engage the driving gear of an automatic adjuster which will be described hereinafter and has a sufficient strength for charging the spring 29. One end of the spring 29 is fitted into and retained by a groove provided in the ratchet part 28a. The other end of the spring 29 hooked on a pin 23b provided on the driving lever 23. A pin 23a united to the driving lever 23 drives trailing shutter curtains $24_1$-$24_5$. A reference numeral 30 indicates a ratchet pawl. There are also arranged a leading shutter curtain driving lever 31, and a pin 31a joined to the driving lever 31 drives the leading shutter curtain through a leading curtain driving spring 32; a ratchet wheel 33; and a ratchet pawl 34. The ratchet wheel 33 and the ratchet pawl 34 are arranged in the same manner as those provided for the trailing shutter curtain.

Figure 5:
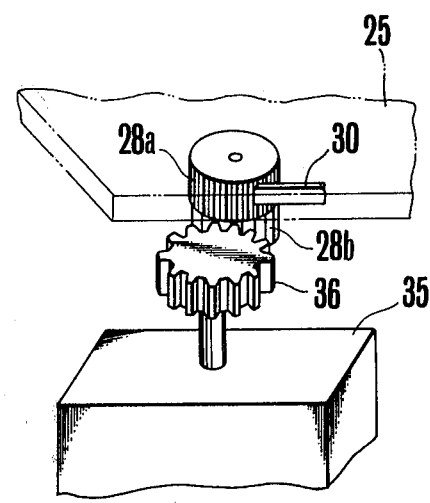
FIG. 5 is a perspective view illustrating the operation of the device of FIG. 4.

FIG. 5 shows the above stated gear part 28b engaging the driving gear 36 of an automatic adjuster 35. The gear 36 is arranged to engage the gear part 28b in a position not in touch with the ratchet pawl 30. The arrangement is such that the spring 29 can be charged by transmitting the force of the automatic adjuster to the ratchet wheel 28 and can be slackened for adjustment by merely rotating the ratchet wheel in opposite directions.

In the embodiment arranged as described above, when the spring 29 is to be adjusted, the driving gear 36 of the automatic adjuster 35 is engaged with the gear part 28b of the ratchet wheel 28 and the gear 36 of the automatic adjuster 35 is operated in one direction. Then, the driving force of the gear 36 causes the ratchet wheel 28 to rotate through the gear part 28b thereof so that the force of the spring 29 is, for example, strengthened. Meanwhile, the ratchet pawl 30 is engaging the ratchet part 28a of the ratchet wheel 28. However, since the teeth of the ratchet part 28a and the ratchet pawl are so shaped as to permit the ratchet to rotate in either direction, the ratchet wheel 28 is rotated by the transmission of the driving force of the gear 36 to the gear part 28b. After the spring 29 is strengthened to a desired degree, the ratchet wheel 28 can be kept in the same position by stopping the automatic adjuster 35, because the ratchet pawl 30 remains engaged with the ratchet part 28a when the automatic adjuster 35 comes to a stop. The driving force of the spring 29 is adjusted in this manner to become stronger.

In the case of weakening the force of the spring 29, the gear 36 of the automatic adjuster 35 is rotated in the opposite direction.

While the spring for the trailing shutter curtain is adjusted as described in the foregoing, the spring for the leading shutter curtain also can be adjusted in the same manner.

Figure 6:
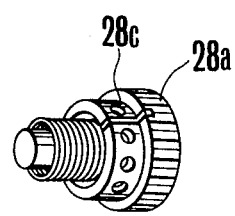
FIG. 6 is a detail view of a modification example of the essential parts shown in FIG. 3.

Further, FIG. 6 shows an example of modification of what is shown in FIG. 4. In this example, the gear 28b is replaced with a plurality of holes 28c. In this case, the gear 36 of the automatic adjuster 35 must be formed into a shape corresponding to these holes 28c.

As described in detail in the foregoing, in the arrangement according to the present invention, the ratchet wheel with which one end of the driving spring is engaged is divided into a ratchet teeth part which is formed at a pitch suited for fine adjustment and a gear part which consists of teeth formed at a relatively coarse pitch suited for transmitting a force. Meanwhile, a driving gear of an automatic adjuster directly engages the above stated gear part. In accordance with the invention, the adjustment of the forces of the shutter driving springs which heretofore required recourse to troublesome manual operation can be automatically accomplished, so that production efficiency can be enhanced to a great extent.

While specific embodiments of the invention have been shown and described in detail to illustrate the application of the inventive principles, it will be understood that the invention may be embodied otherwise without departing such principles.

What is claimed is:

1. A shutter mechanism including a shutter, a shutter driving spring and an adjusting device for adjusting said shutter driving spring, comprising:
    a ratchet wheel capable of adjusting the driving force of said shutter driving spring, said ratchet wheel consisting of a ratchet part which has fine teeth and a gear part which has relatively coarse teeth, said gear part being arranged to engage the gear of an automatic adjuster; and
    a ratchet pawl which keeps the ratchet wheel stationary by engaging the teeth of the ratchet part, said ratchet pawl being arranged to be disengaged from one of the teeth of the ratchet part and to come into engagement with another tooth of the ratchet part to consequently have the driving force of said spring adjusted when the automatic adjuster is actuated with the gear thereof engaged with said gear part of the ratchet wheel.

2. A mechanism according to claim 1, wherein said ratchet part is arranged to be rotatable in either of two directions.

3. A shutter mechanism including a shutter, a shutter driving spring and an adjusting device for adjusting said shutter driving spring, comprising:
    a driving member for driving said shutter;
    a shaft of said driving member, said shaft being arranged to have said driving member rotatable thereon;
    said shutter driving spring being wound around said shaft with one end thereof retained by said driving member;
    a ratchet wheel which is capable of adjusting the driving force of said spring, said ratchet wheel being rotatably disposed on said shaft and having a ratchet part which is provided with fine teeth and a gear part which is provided with relatively coarse teeth, said ratchet part being arranged to retain the other end of said spring, and said gear part being arranged to engage a gear of an automatic adjuster; and
    a ratchet pawl which keeps the ratchet wheel stationary by engaging the teeth of the ratchet part, said ratchet pawl being arranged to be disengaged from one of the teeth of the ratchet part and to come into engagement with another tooth of the ratchet part to consequently have the driving force of said spring adjusted when the automatic adjuster is actuated with the gear thereof engaged with said gear part of the ratchet wheel.

4. A mechanism according to claim 3, wherein said ratchet wheel is shaped into two parts, one part being said ratchet part and the other said gear part.

* * * * *